(12) United States Patent
Kokku et al.

(10) Patent No.: US 8,503,418 B2
(45) Date of Patent: Aug. 6, 2013

(54) METHOD AND SYSTEM FOR ACCOUNTABLE RESOURCE ALLOCATION IN CELLULAR AND BROADBAND NETWORKS

(75) Inventors: Ravindranath Kokku, Monmouth Jct, NJ (US); Rajesh Mahindra, Highland Park, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 25 days.

(21) Appl. No.: 13/152,427

(22) Filed: Jun. 3, 2011

(65) Prior Publication Data

US 2011/0250900 A1 Oct. 13, 2011

Related U.S. Application Data

(63) Continuation-in-part of application No. 13/037,445, filed on Mar. 1, 2011, now Pat. No. 8,351,948.

(60) Provisional application No. 61/309,110, filed on Mar. 1, 2010, provisional application No. 61/351,972, filed on Jun. 7, 2010.

(51) Int. Cl.
*H04W 4/00* (2009.01)

(52) U.S. Cl.
USPC ........... 370/338; 370/331; 370/339; 370/328; 455/266; 455/450; 455/451; 455/452.1; 455/452.2

(58) Field of Classification Search
USPC .... 455/466, 450, 451, 452.1, 452.2; 370/338, 370/339, 331, 328
See application file for complete search history.

(56) References Cited

U.S. PATENT DOCUMENTS

| | | | |
|---|---|---|---|
| 2001/0038640 A1* | 11/2001 | McKinnon et al. | 370/468 |
| 2007/0195787 A1* | 8/2007 | Alnuweiri et al. | 370/395.4 |
| 2007/0230405 A1* | 10/2007 | Yin et al. | 370/335 |
| 2008/0176577 A1* | 7/2008 | Bourlas et al. | 455/454 |
| 2009/0213871 A1* | 8/2009 | Carlson et al. | 370/462 |

* cited by examiner

*Primary Examiner* — Kamran Afshar
*Assistant Examiner* — Khalid Shaheed
(74) *Attorney, Agent, or Firm* — Joseph Kolodka

(57) ABSTRACT

A method includes receiving information flows between users into a basestation of a cellular network, applying a usage accountability framework responsive to predetermined user fairness metrics, bandwidth resources on the network and a history of channel bandwidth variations by the users, and executing bandwidth allocation for the flows between the users responsive to the applying an accountability framework for improving user experience on the network by the users.

11 Claims, 3 Drawing Sheets

METHOD AND SYSTEM FOR ACCOUNTABLE RESOURCE ALLOCATION IN CELLULAR AND BROADBAND NETWORKS

This application claims the benefit of U.S. Provisional Application No. 61/351,972, entitled, "On Accountable Resource Allocation in Broadband Wireless networks", filed Jun. 7, 2010, and is also a continuation-in-part of U.S. patent application Ser. No. 13/037,445, entitled "METHOD AND SYSTEM FOR CUSTOMIZABLE FLOW MANAGEMENT IN A CELLULAR BASESTATION, filed Mar. 1, 2011, which in turn claims the benefit of U.S. Provisional Application No. 61/309,110, entitled "NVS: A Virtualization Substrate for WiMax Networks", filed Mar. 1, 2010, and this application is related to U.S patent application Ser. No. 13/037,442, entitled "METHOD AND SYSTEM FOR VIRTUALIZING A CELLULAR BASESTATION", filed Mar. 1, 2011, all of which are incorporated herein by reference.

BACKGROUND OF THE INVENTION

The present invention relates generally to broadband and wireless communications and more particularly to a method and system for accountable resource allocation ARA in cellular and broadband wireless networks.

Mobile virtual network operators MVNOs are emerging as strong players in the mobile network market to provide enhanced services such as video telephony, live streaming and interactive games (along with traditional voice services) to focused customers. This model is arguably a win-win situation for both MVNOs and mobile network operators MNOs, since MVNOs help MNOs attract and retain a greater number of customers. For MNOs and MVNOs, customizability fosters greater innovation in flow management and other services to achieve differentiation from their competitors (100 and 102). For controlled evaluation of innovations (101), greater customizability would enable deploying and testing new solutions without recompiling or rebooting the basestations. In addition, most basestation manufacturers restrict access to the basestations they provide to the MNOs. Customization would provide MNOs with more access to the flow management with little modification to the basestation. The MNOs can pass this functionality to the different MVNOs it hosts.

As revenue from voice services is decreasing rapidly, data services are receiving increased focus from WiMAX, 3G and LTE network operators. Already, more sophisticated data plans for revenue generation on 3G networks have emerged, and are constantly evolving. Many of these sophisticated data plans include corporate bundle plans where the bandwidth can be shared across a group of employees of a corporation. The management policies of flows/group of flows for a corporation or an enterprise have unique requirements. A network with customized flow management would be an ideal fit for enterprises offering wireless services to its employees. Further, corporate intranets can be made accessible to users "everywhere" through complete virtualization of the network resources (101).

The goal of the global environment for network innovations GENI is to enable a general virtualized environment for supporting experimentation and prototype deployments for studying innovative technologies in large-scale real life scenarios (101). This has not been possible in the past since mobile network operator MNO equipment has been closed for experimentation. Customization can help MNOs to provide a way to deploy and test innovative ideas, while running operational networks. This provides a win-win situation for both network providers and researchers.

Varying channel quality between a user and a base station in cellular and broadband wireless access networks leads to varying channel resource usage per Kbps user throughput. This can adversely affect the overall base station throughput and fairness across users. While users induce some variations, some variations are induced by network deployment. However, no accountability exists in current cellular and broadband wireless networks, leading to a bias during resource allocation towards either network operators or users, thereby hurting the other party.

While several channel-aware research proposals and scheduler implementations do consider variations in channel quality perceived by users, they do so only for exploiting multi-user channel diversity. They do not consider the variations from each user's historical perspective, and hence, do not incorporate accountability to the right extent. Lack of accountability in wireless resource management results in inefficient use of wireless resources, and unfairly penalizes either the network operators or the users.

Accordingly, there is a need for an accountable resource allocation in wireless and broadband networks that is objectively fair to both users and network operators.

BRIEF SUMMARY OF THE INVENTION

In a first aspect of the invention there is provided a method that includes receiving information flows between users into a basestation of a cellular network, applying a usage accountability framework responsive to predetermined user fairness metrics, bandwidth resources on the network and a history of channel bandwidth variations by the users, and executing bandwidth allocation for the flows between the users responsive to the applying an accountability framework for improving user experience on the network by the users.

In a preferred embodiment, the history of channel bandwidth variations by the users comprises long-term history of bandwidth channel variations for each user for categorizing each user as one of a normal bandwidth usage user, and deviant bandwidth usage users. Preferably, the executing step provides at least a first one of the users with a bandwidth fairness, a second one of the users with a time fairness and at least a third one of the users with a combination of bandwidth fairness and time fairness responsive to the history of channel bandwidth variations by the respective users. In addition, the executing step includes partitioning available bandwidth resources on said network between the first, second one third one of the users using a network virtualization approach. The accountability framework categorizes bandwidth usage behavior by the users at any instant in comparison to long-term bandwidth usage history into normal and deviant user classes for treating each of the user classes differently in the step of executing bandwidth allocation and includes allocating resources in terms of time slots to each group of said users in proportion to the percentage of users in said group.

In an alternative aspect of the invention there is provided a network including mobile devices for communicating information flows between each other across a wireless network; and a basestation on the network for applying a usage accountability framework to the information flows responsive to predetermined user fairness metrics, bandwidth resources on the network and prior channel bandwidth variations by the mobile devices.

These and other advantages of the invention will be apparent to those of ordinary skill in the art by reference to the following detailed description and the accompanying drawings.

DETAILED DESCRIPTION

The present invention is directed to an accountable resource allocation ARA technique for cellular or broadband wireless networks. The inventive ARA considers variations from each user's historical perspective, and hence incorporates accountability to a predetermined extent. Accountability in wireless resource management results in efficient use of wireless resources, and fairly penalizes or rewards either the network operators or the users. The inventive ARA is described in the conjunction with a customizable and adaptive flow-management emulator (CAFE) to enable understanding of the invention in a tangible context.

The CAFE provides an interface for flow management in cellular basestations such as WiMAX and LTE and enables deploying different custom flow management schedulers designed for diverse performance objectives on the same basestation. CAFE also provides a generic framework that enables entities, from either within the basestation or outside the basestation, to dynamically configure and execute custom flow management. CAFE defines several interfaces/APIs that allow entities to configure the basestation in distinct ways. These different approaches ensure that the same basestation design can meet the requirements of a broader class of entities. Entities could refer to MNOs, MVNOs, Corporate/enterprise networks, and Experimenters/researchers. Entities may execute outside the physical boundaries of the basestation or within the basestation(e.g., As a Virtual Machine inside the basestation).

Figure 1:
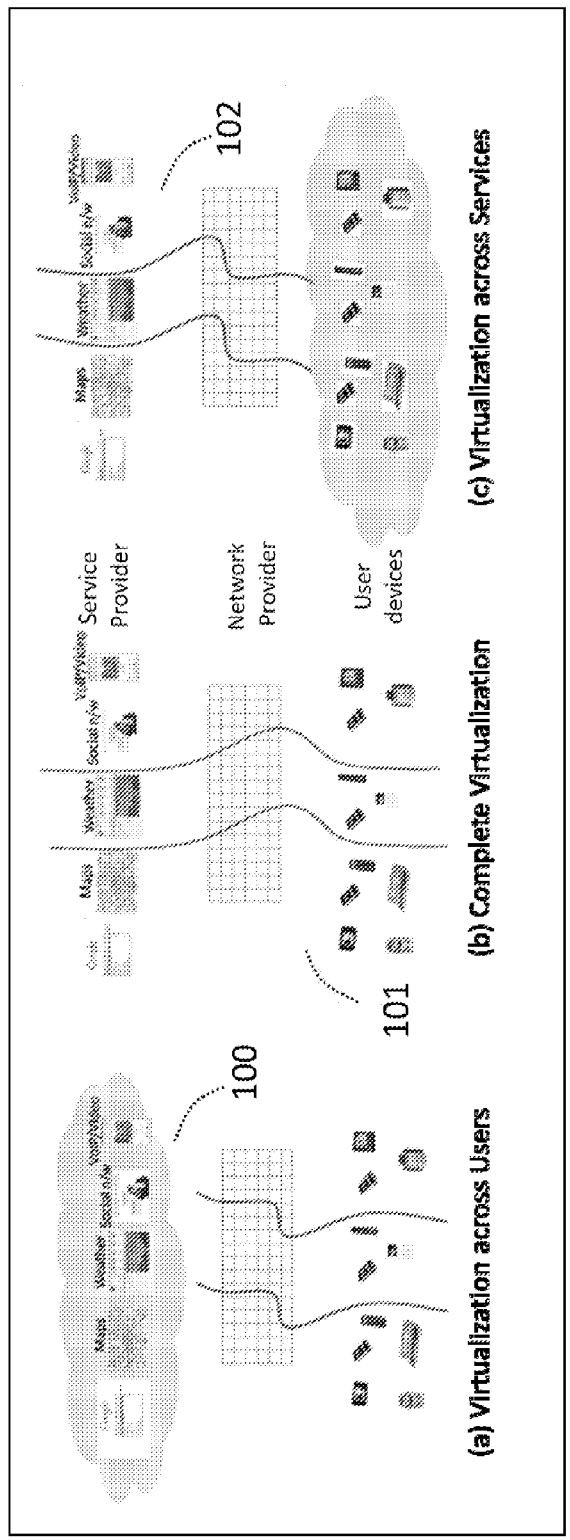
FIG. 1 is depicts exemplary deployment scenarios that benefit from customizable and adaptive flow management and accountable resource allocation in accordance with the invention: (a) Virtualization across Users 100; (b) Complete Virtualization 101; and (c) Virtualization across Services 102.
Figure 2:
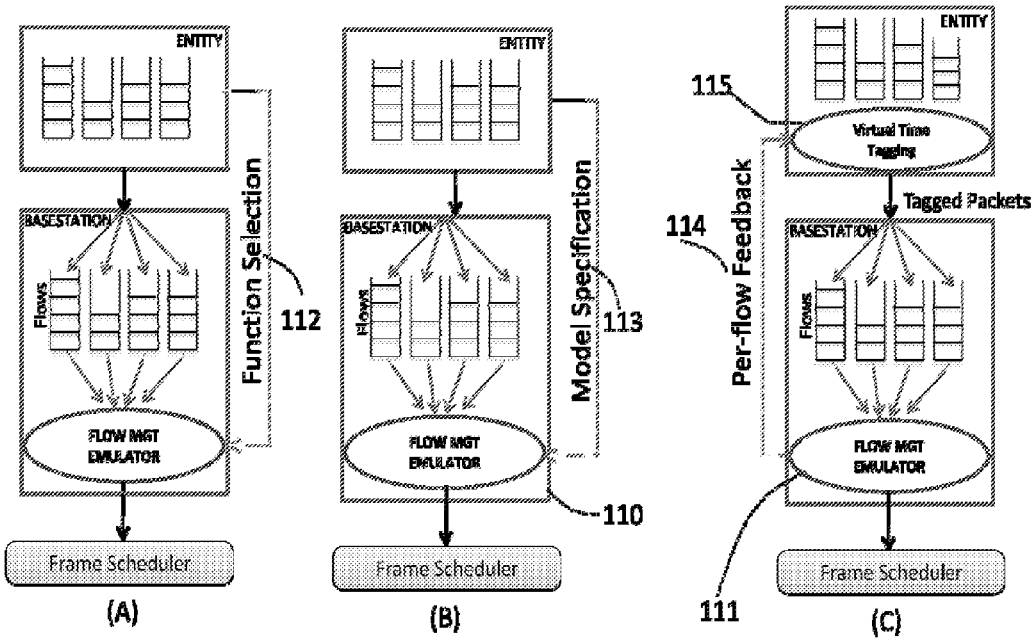
FIG. 2 is an exemplary diagram of an exemplary customizable and adaptive flow management emulator, in which the accountable resource allocation in cellular and broadband networks, according to the invention, can be employed.

Referring now to FIG. 2, there is shown a block diagram of an exemplary CAFE that is a flow management emulation framework, preferably implemented as part of a cellular basestation. The exemplary CAFE includes a flow management emulator 111, a function selection 112, a model specification 113, a model specification 113, a per-flow feedback 114, and a virtual time tagging 115.

The flow management emulator 111 enables the CAFE to provide programming interfaces to let an entity determine the order in which packets of the different flows are to be transmitted. For maximum flexibility and efficiency, the resources have to be allocated at fine timescales such as on a per-packet or per-MAC-frame basis.

Three approaches are defined in CAFE for giving entities the flexibility to specify flow scheduling that has different merits and demerits: function selection 112, model specification 113, and virtual time tagging 114.

With the Function Selection 112 approach, the inventive CAFE provides a variety of commonly employed schedulers from which that entity can choose. This approach may be very attractive to entities like MVNOs, corporate networks, or service providers with no expertise in wireless networking and prefer relying on the basestation to take care of flow management. This approach, however, is not suitable for evaluating new innovations.

With the Model Specification 113 approach, the inventive CAFE provides a programming interface to specify on a per-class or per-flow basis, the weight distribution as a function of the average rate already achieved, modulation and coding scheme, packet loss, the flow's minimum reserved rate and maximum sustained rate. The weight distribution is sent as a set of discrete tuples that are stored in a table in the basestation that CAFE looks-up during flow scheduling. CAFE emulates flow scheduling by choosing the flow(s) in the decreasing order of the weights. For flows with the same weight, CAFE chooses the flow with lower average rate achieved. This approach is general in that a large number of flow schedulers such as RR, WRR and proportional fair, can be specified as a set of discrete tables. However, this approach has a drawback; flow management functions for which the set of weights cannot be represented offline and/or depends on online information such as current allocation of other flows, current channel conditions, etc. cannot be emulated by this approach.

With the per-flow feedback 114 approach, the CAFE provides flow-level feedback to the entity to perform flow scheduling itself, and place a tag on each packet of the flow with a virtual time that monotonically increases. The per-flow feedback includes average rate achieved, packet loss, MCS etc. In this case, CAFE picks from the flows, the packet among all packets at the heads of the flow queues that has the least virtual time. While this approach enables arbitrary flow schedulers to be defined, the drawback of this approach is that the feedback interval impacts the scheduling decisions and may require the entity to be as close to the basestation as possible. Both Model Specification and Virtual Time Tagging may execute within the basestation as Virtual Machines or loadable modules or external entities such as gateways or routers (e.g., ASN gateway or CSN for WiMAX).

When using the Virtual Time Tagging 115 approach for the CAFE, the entity needs to take care of flow scheduling and tagging each packet with the correct virtual time so that CAFE sends out the packets in the desired order. The flow scheduler in the entity makes use of the per-flow feedback from the basestation in order to schedule the order of the packets.

Figure 3:
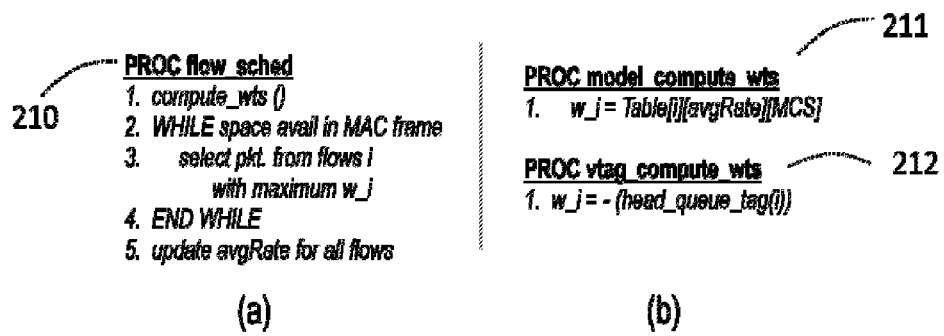
FIG. 3 is a diagram steps for computing flow and weight for a MAC frame, in the CAFE of FIG. 2.

Henceforth, we describe the core engine behind CAFE using an example of a CAFE implementation shown in FIG. 3. For choosing a flow, CAFE may use the following specific method: For each MAC frame, select a flow with the maximum weight. Repeat this until the MAC frame is completely filled up or all flows are satisfied 210, FIG. 3(a).

```
PROCflow_sched
compute_wts( )
WHILE space availin MAC frame
    selectpkt from flows i
        with maximum w_i
END WHILE
update avgRate for all flows
```

Depending on the choice of the approach to be used in the CAFE, the model specification weight calculation 211 or virtual time tagging weight calculation 212 are employed to compute the weight of each flow.

For each MAC frame, select flow with the maximum weight. Repeat this until the MAC frame is completely filled up or all flows are satisfied. Depending on the choice of the approach to be used in CAFE, the model specification or virtual tagging are employed to compute the weight of each flow, 1. w_j=Table[i][avgRate][MCS], 211, 1. w_j=−(head_queue_tag(i)), 212 respectively in FIG. 3, (b).

Alternatively, even fine-grained customization can be achieved (with increased run-time overhead) by executing compute_wts( ) and update avgRate within the WHILE; ie. Weight re-evaluation is done on a per-packet basis.

With the model specification weight calculation 211 the weight of a flow is computed from the weight distribution provided to the CAFE. The weight distribution of each flow is provided as a table of weights for different values of average rate, MCS and/or packet loss.

With the virtual time tagging weight calculation 212 the weight is a value directly mapped from the virtual time tag of the packet at the head of the line of each queue. The entity has to mark each packet with an explicit tag to ensure the order of packet transmission is maintained.

Among the innovations of the CAFE are the design and execution of the flow management emulator 111. The function selection 112, model specification 113 and per-flow feedback 114 are required to support the flow management emulator 111 with three different approaches. The inventive architecture to enable custom flow schedulers supports multiple customized, programmable and dynamically installable/configurable flow management functions. The three approaches 1112-114 enable dynamically configuring the custom flow management function by an entity present within the basestation or outside it.

Figure 4:
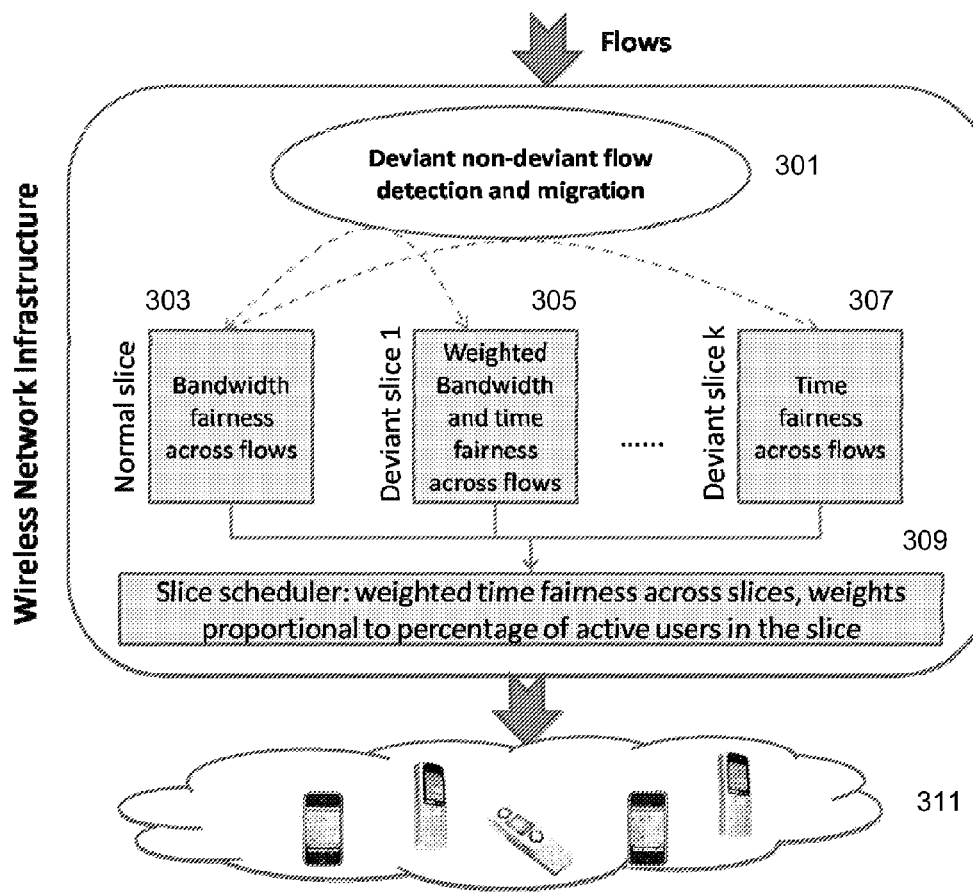
FIG. 4 is an exemplary diagram of an accountable resource allocation ARA, in accordance with the invention.

Referring now to FIG. 4, the diagram shows an exemplary configuration of the inventive accountable resource allocation ARA configuration. The ARA categorizes a user's 311 behavior at any instant (in comparison to the long-term history) into normal and deviant classes 301 and treats each class differently during resource allocation.

The inventive ARA builds on wireless network virtualization technology that facilitates employing multiple customized flow fairness policies simultaneously on a base station. A wireless network virtualization solution separates wireless resources into groups (or slices), and provides Isolation, Customization and Efficient resource utilization across groups of flows. Such an invention is disclosed in U.S. patent application Ser. No. 13/037,442. The reservation (in terms of aggregate throughput or time slots) of each group is configurable by a network operator, and a group scheduler distributes resources in proportion to the reservation of the group.

The wireless network virtualization facilitates the inventive ARA to aggregate the variations in channel quality into different categories and then place the corresponding flows in different groups or slices 309, as shown in FIG. 4. The ARA creates groups for normal, 303, and different deviant behaviors 305, 307 based on operator-defined metrics. The inventive ARA initially maps users to the normal group, 301. Then the ARA continuously monitors and places flows of each user into one of the groups, 303, 305 . . . 307, dynamically to ensure fine-timescale adaptation of flow mapping. To ensure that any form of fairness (time or throughput or a combination of them) can be provided to flows depending on their group, ARA maintains a moving average of throughput and resource slot (time) usage for each flow.

The group or slice scheduler 309 is configured to allocate resources (in terms of time slots) to each group in proportion to the percentage of users 311 in the group. The group scheduling approach is based on the following: Let $N_0$ be the number of users in the normal group, and $N_j$ be the number of users in each of the k deviant groups j; $1 \leq j \leq k$. Let S be the total number of resource slots at a base station for a unit interval, and $S_j^{exp}$ be an exponentially weighted moving average of slots allocated to each group (including all flows). Let $S_j^{rsv}$ be the slot allocation per group chosen by the ARA. Then, $$S_j^{rsv} = S \frac{N_j}{\sum_{i=0}^{k} N_j} \beta,$$

where beta $\beta$ is a weight parameter that allows the network operator to consciously prioritize or de-prioritize certain types of flows. Now, at each instant of time to prepare a MAC frame for transmission, the group scheduler selects the group that has the maximum weight $\rho_j$, where $$\rho_j = \frac{S_j^{rsv}}{S_j^{exp}}, 0 \leq j \leq k$$

This decision ensures that each group of users gets a fair allocation of time resources, irrespective of the individual users' channel qualities. Next, a flow is chosen from within the selected group such that group-specific fairness is ensured with a generalized weighted fairness GWF scheduler, with a different value of w in each group. GWF applies a weighted combination of bytes transferred and OFDMA timeslots allocated to users to provide an operator with a tunable fairness framework. GWF attempts to equalize $w*S_i+(1-w)*(B_i/M)$ for all users i over a time interval, where $0 \leq w \leq 1$ is a weight configurable by a network operator, $S_i$ is the number of slots allocated to user i, $B_i$ is the number of bytes served for user i, and M is the number of bytes per slot for the highest MCS (modulation and coding scheme).

Note that the framework itself is general enough to be applicable to schedulers other than GWF.

The flexibility provided by virtualization technology enables the operators to better customize the deviant behavior of users and control the allocation policies, while relieving the base station vendors from implementing multiple customized and complex scheduling solutions for their different customers. For instance, some network operators may treat mobility as a common case since they only support voice traffic, and prefer to use throughput fairness irrespective of the channel quality. Whereas, another operator may choose mobility as a deviant case, and charge users extra to users who induce bad channel quality and demand more resources, or reduce the allocation to those users until the channel quality improves.

Several deviant behaviors by users can be identified and addressed with the group or slice scheduler. For example, an operator can define thresholds on the deviation around the mean that is considered normal behavior and beyond these thresholds, a user may be considered deviant. There can be further thresholds to determine if the deviation is within a tolerance or beyond tolerance. This general technique can help identify cell-edge users, normal users and nomadicity. It could also be useful to detect users with two main static locations of presence (e.g. office and home. It is noted that the long-term user history has to be over a finite time span (such as one week) to avoid remembering stale information (such as when a user moves to a new house).

From the foregoing it can be appreciated that the inventive accountable resource allocation enables a cellular or network basestation to manage resource usage accountability between users 311 communicating across the networks based on the users history of channel variations, thereby providing better user experience and higher base station throughput. Based on long-term history of channel variations observed for each individual user 311, users can be categorized as normal and deviant users. Users in the normal category of slice flows 303 can be provided with a bandwidth fairness defined by the operator of the basestation. Users in the deviant class or slices can be provided with time fairness or a combination time and bandwidth frames depending on how deviant bandwidth their usage behavior has been from normal bandwidth usage behavior. Resources in the cellular system or network can be split across the normal and deviant groups of users and their corresponding information flow slices using the resource virtualization approach.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
receiving information flows between users into a basestation of a cellular network;
applying a usage accountability framework responsive to predetermined user fairness metrics, bandwidth resources on said network and a history of channel bandwidth variations by said users; and
executing bandwidth allocation for said flows between said users responsive to said applying an accountability framework for improving user experience on said network by said users,
wherein said usage accountability framework comprises a slot allocation of said bandwidth resources $S_j^{rsv}$ comprising $$S_j^{rsv} = S \frac{N_j}{\sum_{i=0}^{k} N_j} \beta,$$

with $N_j$ being the number of users in each of k deviant groups j; $1 \leq j \leq k$, S being the total number of resource slots at said base station for a unit interval, and beta being a weight parameter enabling said network to prioritize or de-prioritize different types of information said flows between said users across said network.

2. The method of claim 1, wherein said history of channel bandwidth variations by said users comprises long-term history of bandwidth channel variations for each user for categorizing said each user as one of a normal bandwidth usage user, and deviant bandwidth usage users.

3. The method of claim 1, wherein said executing step provides for at least two of i) a first group of said users with a bandwidth fairness, ii) a second group of said users with a time fairness, and iii) a third group of said users with a combination of bandwidth fairness and time fairness responsive to said history of channel bandwidth variations by said respective users.

4. The method of claim 3, wherein said executing step comprises partitioning available bandwidth resources on said network between said first, second one third groups of said users using a network virtualization approach.

5. The method of claim 1, wherein said usage accountability framework categorizes bandwidth usage behavior by said users at any instant in comparison to long-term bandwidth usage history into normal and deviant user classes for treating each of said user classes differently in said step of executing bandwidth allocation.

6. The method of claim 1, wherein said usage accountability framework comprises allocating resources in terms of time slots to each group of said users in proportion to the percentage of users in said group.

7. The method of claim 1, wherein said usage accountability framework comprises a group specific fairness in bandwidth allocation between said users comprising a weighted combination of bytes transferred and OFDMA timeslots allocated said to users to enable said network with a tunable fairness framework.

8. The method of claim 7, wherein said gross weighted fairness comprises an attempt to equalize $w*S_i+(1-w)*(B_i/M)$ for all users i over a time interval, where $0 \leq w \leq 1$ is a weight configurable by said network, $S_i$ is the number of slots allocated to user i, $B_i$ is the number of bytes served for user i, and M is the number of bytes per slot for the highest MCS modulation and coding scheme.

9. A network comprising:
mobile devices for communicating information flows between each other across a wireless network; and
a basestation on said network for applying a usage accountability framework to said information flows responsive to predetermined user fairness metrics, bandwidth resources on said network and prior channel bandwidth variations by said mobile devices,
wherein said usage accountability framework comprises a slot allocation of said bandwidth resources $S_j^{rsv}$ comprising $$S_j^{rsv} = S \frac{N_j}{\sum_{i=0}^{k} N_j} \beta,$$

with $N_j$ being the number of users in each of k deviant groups j; $1 \leq j \leq k$, S being the total number of resource slots at said base station for a unit interval, and beta being a weight parameter enabling said network to prioritize or de-prioritize different types of information said flows between said users across said network.

10. The network of claim 9, wherein said basestation comprises a configuration for executing bandwidth allocation for said information flows between said mobile devices responsive to said usage accountability framework for improving user experience on said network by users of said mobile devices.

11. A method comprising the steps of:
receiving information flows between users into a basestation of a cellular network;

applying a usage accountability framework responsive to predetermined user fairness metrics, bandwidth resources on said network and a history of channel bandwidth variations by said users; and executing bandwidth allocation for said flows between said users responsive to said applying an accountability framework for improving user experience on said network by said users, wherein said usage accountability framework comprises selecting a group of said having a maximum weight of $\rho_j$ comprising $$\rho_j = \frac{S_j^{rsv}}{S_j^{exp}}, 0 \leq j \leq k,$$

with k deviant groups j, $S_j^{exp}$ be an exponentially weighted moving average of slots allocated to each group (including all flows), and $S_j^{rsv}$ be the slot allocation per group chosen for a fair allocation of said bandwidth resources irrespective of channel qualities for individual said users.

* * * * *